March 17, 1970 — W. S. WATTS — 3,501,178
TUBULAR COUPLING MEMBER
Filed Oct. 3, 1967 — 2 Sheets-Sheet 1
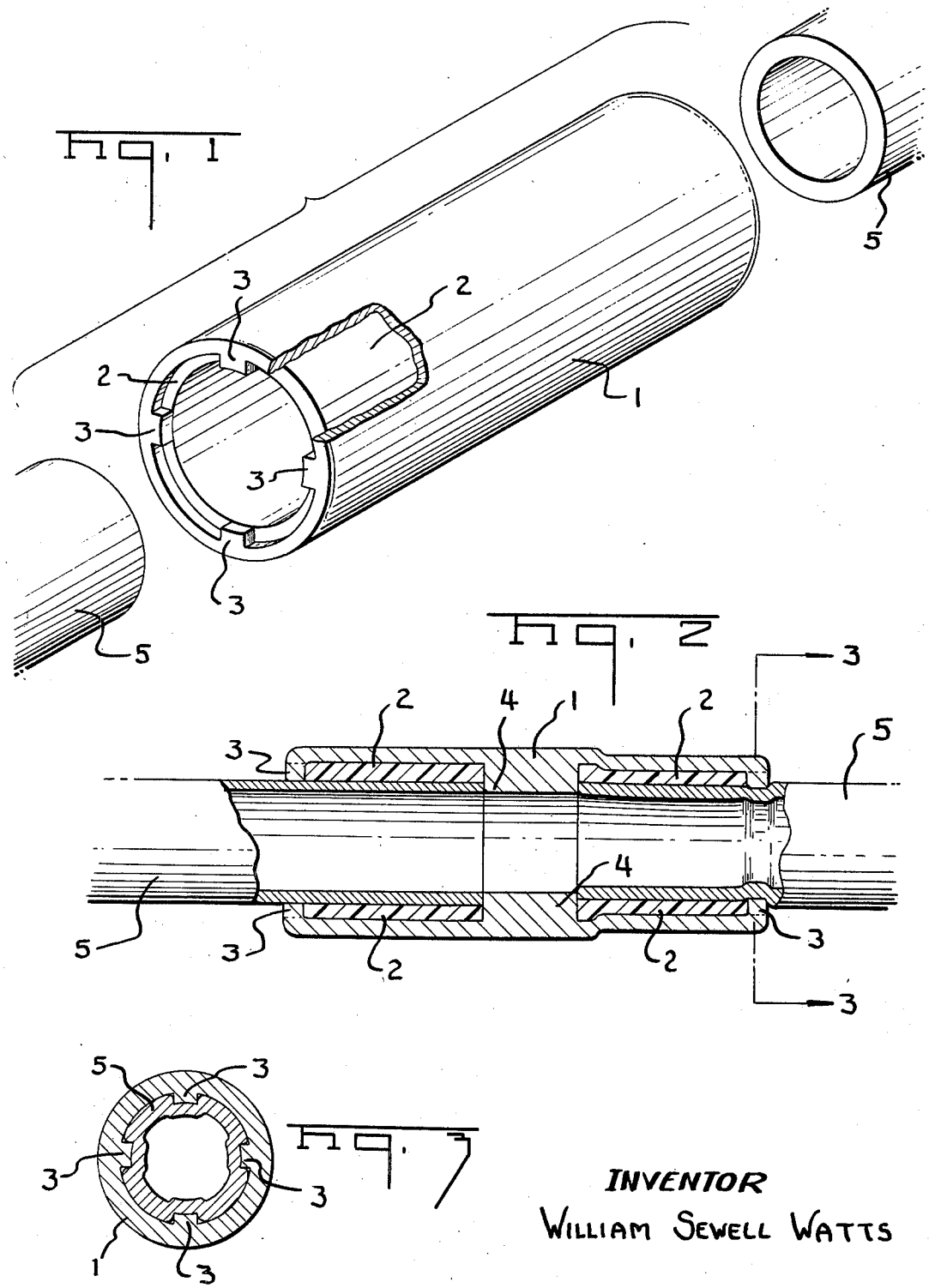
INVENTOR
WILLIAM SEWELL WATTS
BY: Adrian J. LaRue March 17, 1970 W. S. WATTS 3,501,178
TUBULAR COUPLING MEMBER
Filed Oct. 3, 1967 2 Sheets-Sheet 2
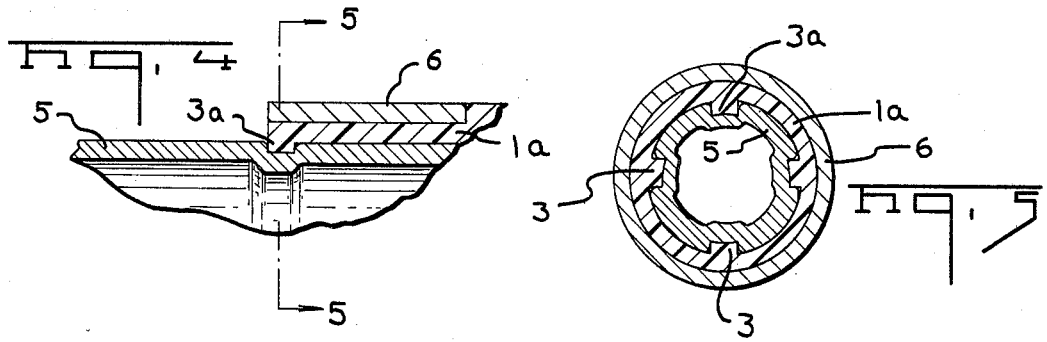
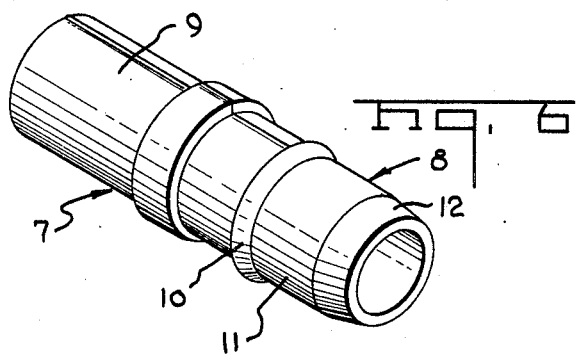
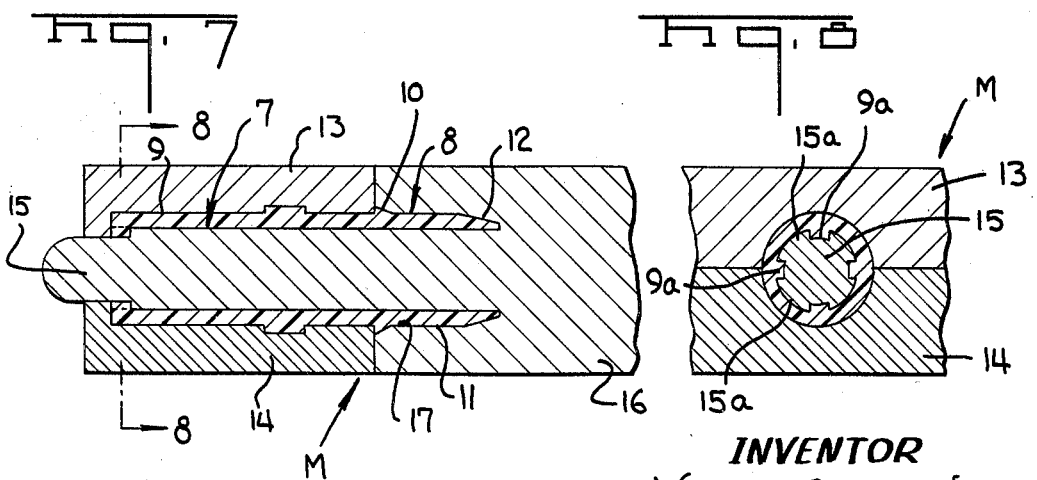
INVENTOR
WILLIAM SEWELL WATTS
BY: Adrian J. LaRue United States Patent Office 3,501,178
Patented Mar. 17, 1970

3,501,178
TUBULAR COUPLING MEMBER
William Sewell Watts, Harrisburg, Pa., assignor to AMP Incorporated, Harrisburg, Pa.
Filed Oct. 3, 1967, Ser. No. 672,552
Int. Cl. F16c 21/02
U.S. Cl. 285—369                                3 Claims

ABSTRACT OF THE DISCLOSURE

A tubular coupling member for coupling tubular members together comprises inwardly-directed lugs at the ends of a sleeve which deform tubular members when the sleeve is decreased in diameter thereby providing anti-torque means to prevent turning of the tubular members.

---

This invention relates to coupling members and more particularly to coupling members for sealing couplings to ends of tubular members.

It is common practice to apply a coupling member to an end of a tubular member by means of threaded mating members which compress a member into engagement with the tubular member. This type of coupling member takes time to apply in addition to the problem of leaving the mating members too loose or too tight which creates problems with respect to sealing and stripping of threads.

Another conventional coupling between tubular members involves placing an end of a tubular member into an end of another tubular member which is either larger in diameter or has an expanded end to form a telescopic joint, deforming the telescopic joint to secure the ends together. In some cases, epoxy resin is disposed on one of the ends prior to the joint being deformed; solder has also been used. Other cases teach deforming the larger end around O-rings while the smaller end is maintained substantially undeformed. Further cases disclose an end of a tube of hard material having a deformed area and a coating of epoxy resin or sealing material thereon disposed within an end of a tube of softer material, and a ring of harder material than the softer tube is moved across the overlapping ends of the tubes thereby causing an internal portion of the softer tube to flow into the deformed area of the hard tube. These joints take time to make and they are messy.

It is an object of the present invention to provide a coupling member for joining tubing that is readily applied to the ends of the tubing.

Another object of the invention is the provision of a coupling member that is provided with anti-torquing means.

A further object is to provide a tube fitting that is sealingly applied to an end of tubing.

An additional object is the provision of a tubing fitting that has one end sealingly securable to an end of tubing while the other end is removably connected to tubing.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

In the drawings:
FIGURE 1 is a perspective exploded view of a coupling member with a part broken away therefrom and tubular members exploded therefrom;
FIGURE 2 is a longitudinal cross-sectional view of FIGURE 1 with the tubular members in position in the coupling member and one end crimped onto one of the tubular members;
FIGURE 3 is a view taken along lines 3—3 of FIGURE 2;
FIGURE 4 is a partial cross-sectional view of an alternative embodiment;
FIGURE 5 is a view taken along lines 5—5 of FIGURE 4;
FIGURE 6 is a perspective view of another embodiment;
FIGURE 7 is a cross-sectional view of the fitting of FIGURE 6 being molded; and
FIGURE 8 is a view taken along lines 8—8 of FIGURE 7.

Turning now to the drawings and more particularly FIGURES 1 through 3, a metallic tubular coupling member 1 is illustrated which has a tubular configuration and thin sealing sleeves 2 of suitable sealing material are disposed in each end. The outer ends of tubular coupling member 1 have inwardly-directed lugs 3 which maintain sleeves 2 in position within the coupling member against annular shoulder 4. The annular shoulder can also take the form of a groove or detents to form an inwardly-directed annular shoulder or inwardly-directed projections. After tubular members 5 are placed within coupling member 1 against annular shoulder 4, which serves as a stop means to properly locate tubular members 5 within the tubular coupling member, crimping pressure is applied via a crimping tool of the type completely disclosed in U.S. Patent application, Ser. No. 517,747, filed Dec. 30, 1965, now U.S. Patent No. 3,378,282, and assigned to the present assignee, to the coupling member over sleeves 2 to decrease the coupling member in diameter causing sleeves 2 to sealingly engage the tubular members and lugs 3 thereby deforming the tubular members to provide anti-torque means to prevent the tubular members from being readily turned.

If tubular members 5 are soft metal or plastic material, an insert should be inserted within the end thereof in order to provide back-up pressure during the crimping operation.

Tubular coupling member 1 as illustrated in FIGURES 1 through 3 is made of metal but tubular coupling member 1a can be made of plastic material as illustrated in FIGURES 4 and 5 with a ferrule member 6 disposed along the areas to be crimped in order to drive inwardly-directed lugs 3a into the tubular member so as to deform same in the manner of the tubular coupling member of FIGURES 1 through 3. The plastic material, of course, serves as a sealing means when crimped via ferrule member 6 onto the tubular member 5.

FIGURE 6 illustrates a tubing coupling member or fitting 7 which has a barbed section 8 at one end and a crimpable section 9 similar in configuration to that illustrated in FIGURES 4 and 5 at the other end. Barbed section 8 has a barb 10, an intermediate section 11 and a beveled nose 12 on an exterior surface so that an end of a rubber or plastic hose can be inserted thereover in order to be maintained in position via barb 10. Barbed section 8 is absent any mold marks along the leading edge of barb 10, intermediate section 11 and beveled nose 12 so as to preclude any leakage paths and FIGURES 7 and 8 illustrate a mold to form the fitting of FIGURE 6. Thus, section 8 is continuous and smooth.

Mold M comprises lateral closing dies 13 and 14 and a core pin 15 extending outwardly from block 16. A cylindrical groove 17 is formed in block 16 around core pin 15 to form beveled nose 12, section 11 and barb 10 of fitting 7 without any parting lines and mandrel 15 has spaced projections 15a in order to form inwardly-directed lugs 9a similar to lugs 3 of FIGURES 4 and 5. Thus, the fitting of FIGURE 6 can be crimped onto a tubular member via section 9 and receive along the exterior surface of barbed section 8 a rubber hose or the like. Of course, barbed section 8 can be part of body member such as, for example, a manifold instead of being part of a coupling device as illustrated.

It will, therefore, be appreciated that the aforementioned and other desirable objects have been achieved; however, it should be emphasized that the particular embodiments of the invention, which are shown and described herein, are intended as merely illustrative and not as restrictive of the invention.

The invention is claimed in accordance with the following:

1. A tubular coupling member for sealingly securing on an end of a tubular member comprising a body member having a tubular configuration in which the end of the tubular member is to be disposed, sealing means disposed along an interior surface of said body member, and inwardly-directed lug means at an outer end of said body member and being disposed at substantially equi-distant locations around the outer end, said lug means extending beyond an internal diameter of said body member, said body member adapted to deform the tubular member when the body member is decreased in diameter along said sealing means and lug means to sealingly engage the end of the tubular member and deform it along the section of said lug means in accordance with the configuration of said lug means and with said lug means forming indentations in the tubular member to interlock said coupling member onto the tubular member.

2. A tubular coupling member according to claim 1 wherein stop means is provided on said interior surface adjacent said sealing means against which the end of the tubular member engages to locate the end of the tubular member within said body member.

3. A tubular coupling member for sealingly securing on an end of a tubular member comprising a body member of material having plastic characteristics and provided with a tubular configuration in which the end of the tubular member is to be disposed, a ferrule member extending along a section of said body member from an outer end inwardly, and inwardly-directed lug means at said outer end, said lug means being positioned around the outer end at substantially equidistant locations, said lug means extending beyond an internal diameter of said body member, said ferrule member being reducible in diameter under radial pressure thereby causing said body member to sealingly engage said tubular member along said section and said lug means to deform the tubular member thereunder in correspondence to the configuration of said lug means and with said lug means forming indentations in the tubular member to interlock said coupling member onto the tubular member.

References Cited

UNITED STATES PATENTS

| | | | |
|---|---|---|---|
| 650,862 | 6/1900 | McTighe | 287—109 |
| 2,327,650 | 8/1943 | Klein. | |
| 3,149,861 | 9/1964 | Larsson | 285—382.2 |
| 3,343,252 | 9/1967 | Reesor | 285—382.2 |
| 3,378,282 | 4/1968 | Demler | 285—382 |

DAVID J. WILLIAMOWSKY, Primary Examiner

WAYNE L. SHEDD, Assistant Examiner

U.S. Cl. X.R.

285—382.2; 287—109